United States Patent [19]

Yamaguchi et al.

[11] Patent Number: 5,736,914

[45] Date of Patent: Apr. 7, 1998

[54] DEMAGNETIZING DEVICE FOR A CATHODE RAY TUBE

[75] Inventors: Kazunari Yamaguchi; Kouji Tanaka; Yukitaka Hisamatsu, all of Tokyo, Japan

[73] Assignee: Mitsubishi Denki Kabushiki Kaisha, Tokyo, Japan

[21] Appl. No.: 582,886

[22] Filed: Jan. 4, 1996

[30] Foreign Application Priority Data

Oct. 13, 1995 [JP] Japan ............... 7-265427

[51] Int. Cl.[6] ............... H01F 13/00
[52] U.S. Cl. ............... 335/284; 361/150; 335/214; 315/8
[58] Field of Search ............... 335/210–214; 315/8, 85; 361/150; 313/440

[56] References Cited

U.S. PATENT DOCUMENTS 2,907,914 10/1959 Brownell ............... 315/8
3,317,781 5/1967 Barbin et al. ............... 361/150
3,879,633 4/1975 Stark, Jr. ............... 315/8
4,359,707 11/1982 Spannhake et al. ............... 335/284

FOREIGN PATENT DOCUMENTS 61-263388 11/1986 Japan.
62-287789 12/1987 Japan.
63-276993 11/1988 Japan.

*Primary Examiner*—Michael L. Gellner
*Assistant Examiner*—Raymond Barrera
*Attorney, Agent, or Firm*—Burns, Doane, Swecker & Mathis, LLP

[57] ABSTRACT

A demagnetizing device for a cathode ray tube having a screen portion and a funnel portion, comprising:
- an outer magnetic shielding member which is arranged so as to surround a funnel portion of a cathode ray tube, and which is formed of a magnetic sheet; and
- a demagnetizing coil which is arranged so as to encircle a screen portion of the cathode ray tube;
- wherein the demagnetizing coil is arranged so as to be apart from the outer magnetic shielding member by not less than 9.5 mm.

4 Claims, 5 Drawing Sheets

DEMAGNETIZING DEVICE FOR A CATHODE RAY TUBE

BACKGROUND OF THE INVENTION

1. Field of the Invention

The present invention relates to a demagnetizing device for removing residual magnetism in a cathode ray tube (hereinbelow, referred to as CRT).

2. Discussion of Background

In general, CRTs have in their inside or in their vicinity a structure which is made from an easily magnetizable member (e.g. a steel sheet). CRTs also have a magnetic shielding member which prevents image quality from lowering due to an influence by the geomagnetic field.

Those members are required to have their own inherent magnetism (also referred to as residual magnetism) erased when CRTs have been assembled. For the purpose, conventional CRTs include a demagnetizing coil, and an a.c. current flows in the coil to erase magnetism in e.g. metallic members in their vicinity by gradually decreasing the current to 0, as shown in e.g. JP-A62287789.

In FIG. 7, there is shown a cross-sectional view of the CRT in a conventional display device and peripheral parts of the CRT, and reference numeral 3 designates the CRT.

Reference numeral 13 designates a cathode electrode in the CRT 3. Reference numeral 14 designates a correction magnet referred to as CP-ASSY. Reference numeral 15 designates a deflection yoke which controls the direction of electron beams. Reference numeral 16 designates an inner magnetic shielding member in the CRT 3. Reference numeral 17 designates a demagnetizing coil which is arranged to encircle the outer periphery of the CRT 3. Reference numeral 19 designates a shadow mask which is arranged in the CRT. Reference numeral 20 designates an implosion-proof band which is constituted by looping a steel sheet around the CRT 3.

In FIG. 7, there are not shown a cabinet housing the CRT, or electronic device in the vicinity of the CRT.

Reference numeral 18 designates an outer magnetic shielding member which is arranged to surround the outer surface of the CRT 3, and which is made of a magnetic metallic sheet.

The demagnetizing coil 17 and the outer magnetic shielding member 18 constitute a demagnetizing device 50.

In FIG. 7, an electron beam is indicated by reference numeral 60 for illustration. Reference numeral 61 designates to a fluorescent screen.

In FIG. 8, there is shown a perspective view of the structure of the outer magnetic shielding member 18 to better understand the positional relationship between the outer magnetic shielding member 18 and the demagnetizing coil 17.

In FIG. 8, the demagnetizing coil 17 is mounted to the outer magnetic shielding member 18 by clamps 29 so that the demagnetizing coil adheres to the inner surface of the outer magnetic shielding member.

In the CRT 3 of FIG. 7, the electron beam 60 which is emitted from the cathode electrode 13 reaches the fluorescent screen 61 passing through the magnetic fields of the CP-ASSY 14 and the deflection yoke 15. Since the shadow mask 19 in the CRT 3 and the inner magnetic shielding member 16 in the CRT 3 are magnetized by an external magnetic field (not shown) such as geomagnetism, the electron beam 60 deviates from a targeted position, creating problems in that display quality is degraded (e.g. landing deviation, convergence deviation, raster position deviation, raster distortion).

In the past, an a.c. current which is gradually damped has been flowed in the demagnetizing coil 17 mounted for erasing the magnetization (it has been commonly used to connect a capacitor with a d.c. current accumulated therein in parallel with the demagnetizing coil 17 as shown in JP-A-62287789) to remove the residual magnetism.

Although the outer magnetic shielding member 18 for the CRT 3 is required in order to further decrease the influence of the geomagnetism, contact between the outer magnetic shielding member 18 and the demagnetizing coil 17 contributes to lower the demagnetizing function because an induced current flows in the outer magnetic shielding member 18 so as to deny the a.c. current flowed in the demagnetizing coil 17, or because there is so-called iron loss in the outer magnetic shielding member.

In FIG. 9, there is shown an a.c. current which flows in the demagnetizing coil 17. A capacitor with a d.c. voltage accumulated therein (not shown) is connected in parallel with the demagnetizing coil 17 to constitute an LC resonance circuit, thereby damping the a.c. current by itself.

The smaller the difference between the value IA of a first amplitude and the value IB of a second amplitude is, the better the magnetizing effect is.

A ratio of IB to IA will be referred to as B/A.

The structure of the conventional demagnetizing device as stated above creates a problem in that the demagnetizing ability of the demagnetizing coil 17 is lowered.

SUMMARY OF THE INVENTION

It is an object of the present invention to solve the problem, and to improve the demagnetizing ability and provide an outer magnetic shielding member which is suitable to improve the demagnetizing ability.

According to a first aspect of the present invention, there is provided a demagnetizing device for a cathode ray tube having a screen portion and a funnel portion, comprising an outer magnetic shielding member which is arranged so as to surround a funnel portion of a cathode ray tube, and which is formed of a magnetic sheet; and a demagnetizing coil which is arranged so as to encircle a screen portion of the cathode ray tube; wherein the demagnetizing coil is arranged so as to be apart from the outer magnetic shielding member by not less than 9.5 mm.

According to a second aspect of the present invention, there is provided a demagnetizing device wherein the demagnetizing coil is mounted to a circumference of a bezel which is arranged in front of the cathode ray tube.

According to a third aspect of the present invention, there is provided a demagnetizing device for a cathode ray tube, comprising an outer magnetic shielding member which is arranged so as to surround a funnel portion of a cathode ray tube, and which is formed of a magnetic sheet; and a demagnetizing coil which is arranged at a front end of the outer magnetic shielding member so as to encircle a screen portion of the cathode ray tube; wherein the outer magnetic shielding member has cutouts formed therein along the demagnetizing coil, the cutouts having such a width that the distance between the demagnetizing coil and the outer magnetic shielding member is not less than 9.5 mm, and having a length that is longer than 60% of the entire length of the demagnetizing coil.

According to a fourth aspect of the present invention, there is provided a demagnetizing device wherein the cutouts are arranged in an upper surface, a lower surface, and opposed side surfaces of the outer magnetic shielding member.

In accordance with the first and the second aspect of the present invention, the presence of a predetermined distance between the demagnetizing coil and the outer magnetic shielding member can decrease iron loss to lower damping factor in a current so as to lengthen a damping time, thereby improving demagnetizing ability.

In accordance with the third and the fourth aspect of the present invention, the cutouts which are formed in the outer magnetic shielding member can lessen an area where the demagnetizing coil is closed to the outer magnetic shielding member, thereby decreasing iron loss to improve demagnetizing ability.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

A first embodiment of the present invention will be described in detail with reference to FIGS. 1–3.

Figure 1:
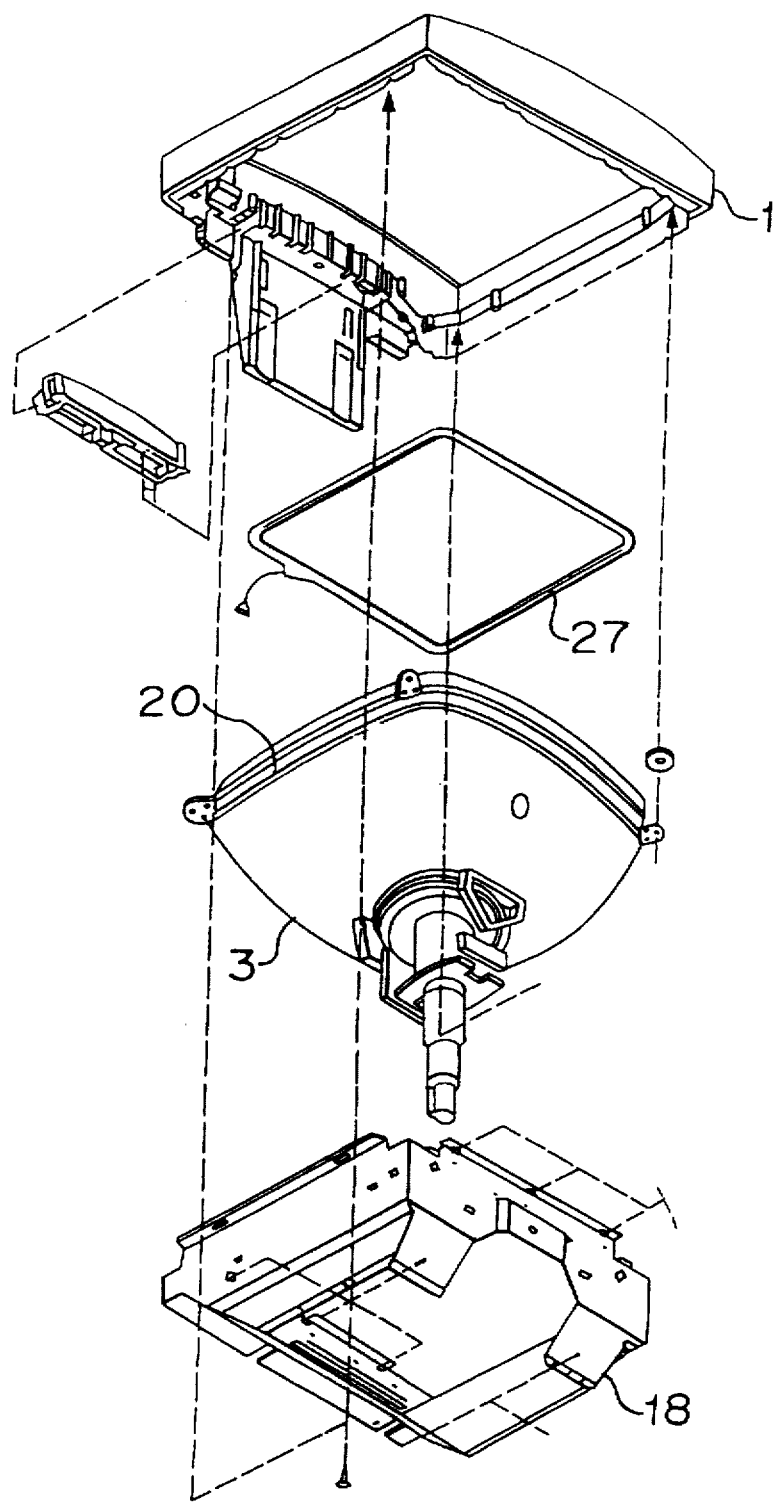
FIG. 1 is an exploded view of a first embodiment of the demagnetizing device according to the present invention.
Figure 2:
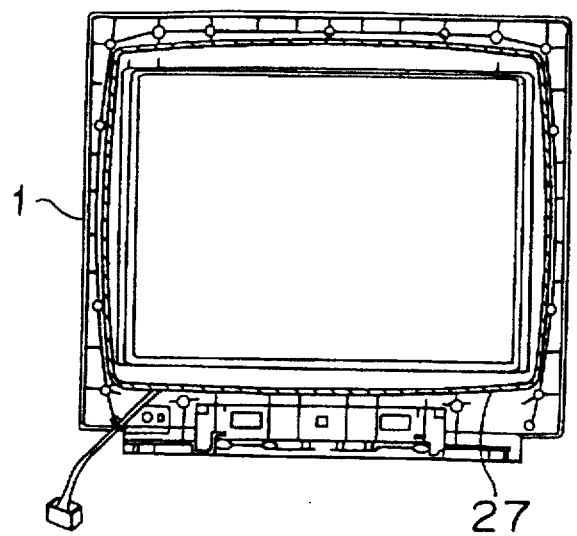
FIG. 2 is a schematic view showing an arrangement of the demagnetizing coil of FIG. 1 in detail.

In FIG. 1, there is shown an exploded view showing the relationship among a demagnetizing device 51, a CRT 3 and other members in accordance with the first embodiment. Like reference numerals designate identical or corresponding part throughout the several views.

In FIG. 1, reference numeral 1 designates a bezel which holds the CRT 3. Reference numeral 27 designates a demagnetizing coil according to the first embodiment, which is mounted to the bezel 1. Reference numeral 18 designates an outer magnetic shielding member. Reference numeral 20 designates an implosion-proof band. The demagnetizing device 51 is constituted by the demagnetizing coil 27 and the outer magnetic shielding member 18.

Figure 7:
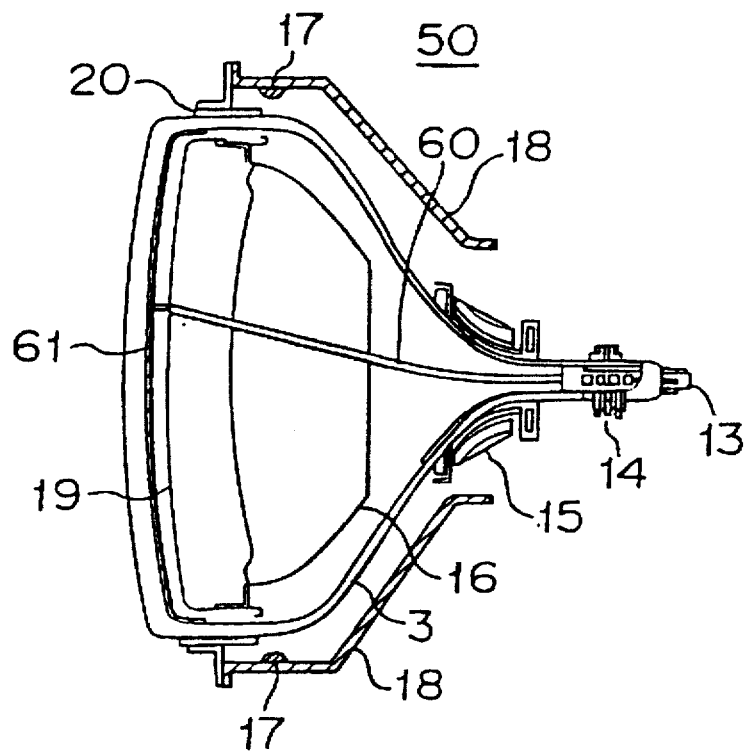
FIG. 7 is a schematic view showing the structure of a CRT with a conventional demagnetizing device.
Figure 8:
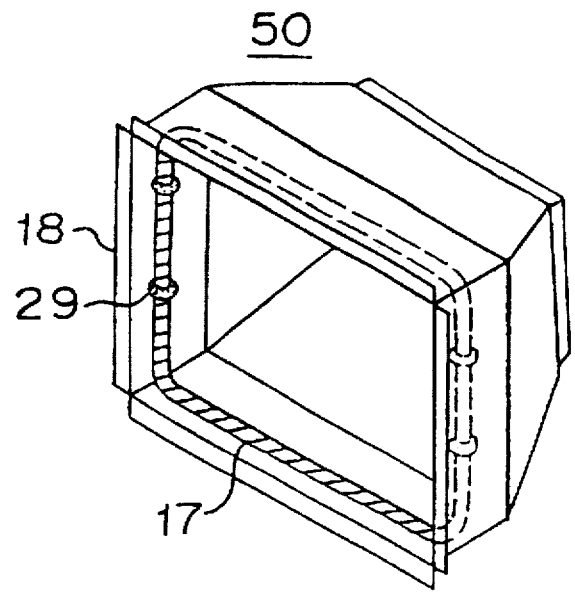
FIG. 8 is a perspective view of the demagnetizing device of FIG. 7.
Figure 9:
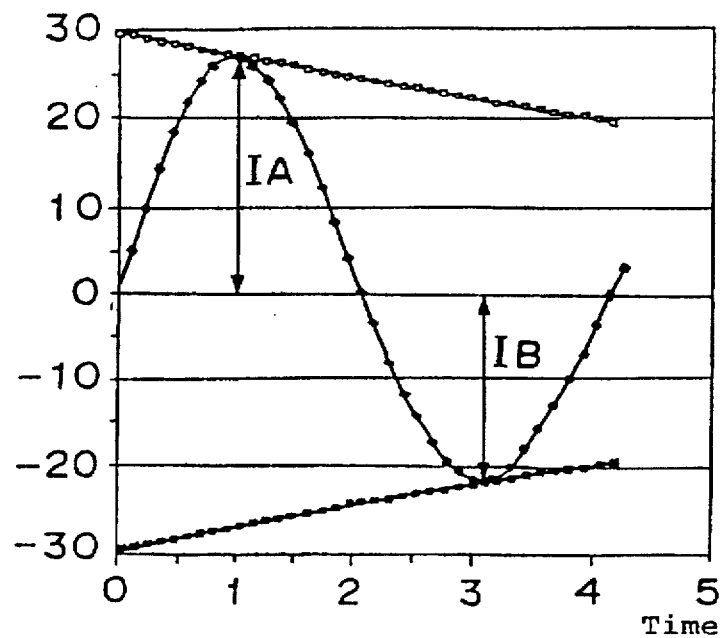
FIG. 9 is a graph to help explain an oscillating current in the demagnetizing coil.

The structure of the demagnetizing coil 27 is the same as the conventional demagnetizing coil 17 shown in FIG. 7. In FIG. 2, there is shown a schematic view showing the relationship between the bezel 1 and the demagnetizing coil 27 shown in FIG. 1.

Figure 3:
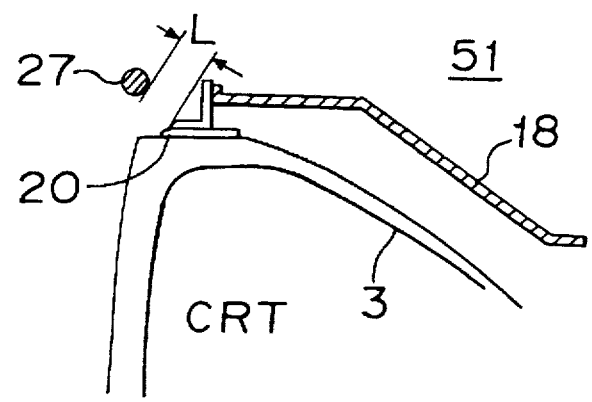
FIG. 3 is a cross-sectional view showing the positional relationship among the demagnetizing coil, the outer magnetic shielding member and the CRT of FIG. 1.

In FIG. 3, there is shown a schematic view to help explain the positional relationship among the demagnetizing coil 27, the outer magnetic shielding member 18 and the CRT 3 when assemblage has been completed by mounting the CRT 3 to the bezel 1 shown in FIG. 1. In FIG. 3, the bezel 1 is omitted for the sake of simplicity.

In assemblage, the demagnetizing coil 27 is pressed into the bezel 1 to be held and mounted to the bezel 1. After that, the bezel 1 with the demagnetizing coil 27 held therein is mounted to the CRT 3.

The outer magnetic shielding member 18 may be mounted to the CRT 3 either before or after mounting the bezel 1 to the CRT 3.

When assemblage has been completed, i.e. when a predetermined positional relationship has been established between the bezel 1 and the CRT 3, the demagnetizing coil 27 is arranged in such a position that the demagnetizing coil 27 is apart from the outer magnetic shielding member 18 and the implosion-proof band 20 by a predetermined distance L as shown in FIG. 3.

The function of the first embodiment will be explained. In FIG. 3, the presence of the predetermined distance L between the demagnetizing coil 27 and the outer magnetic shielding member 18 or the implosion-proof band 20 can lessen iron loss when a damping current flows in the demagnetizing coil 27. In order to obtain a sufficient effect, L is set to 9.5 mm or more.

A decrease in iron loss can lower the damping factor of the current flowing in the demagnetizing coil 27 to lengthen the damping time, thereby improving demagnetizing ability.

However, it is not meant that the greater the value of L is the better the demagnetizing ability. Although an increase in L increases B/A and consequently decreases damping as shown in FIG. 6, such an increase in L requires that the outer magnetic shielding member 18 has to be displaced backward accordingly, which creates a decrease in shielding effect against external magnetism.

From this viewpoint, the upper limit of L is as small as about 20 mm. This size is almost constant even if the size of the CRT 3 changes.

Figure 6:
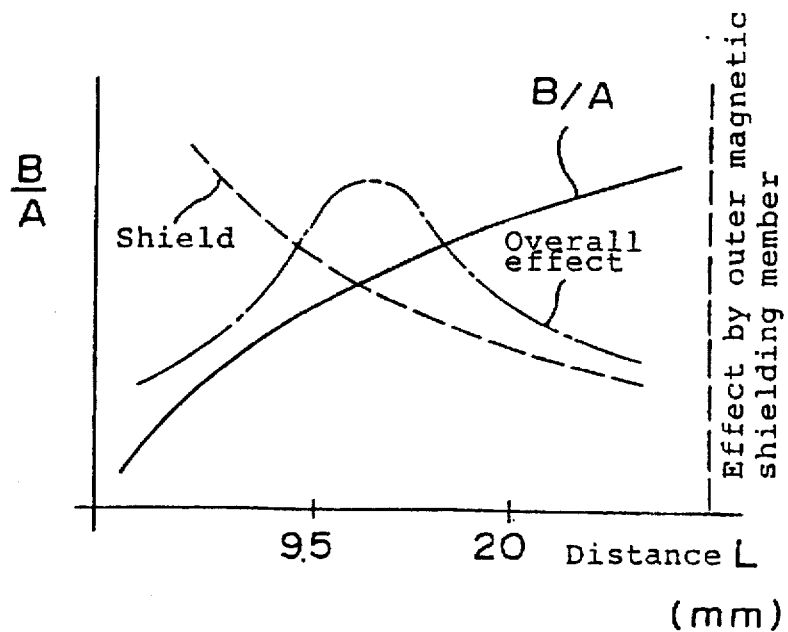
FIG. 6 is a graph to help explain overall effects with respect to the distance L.

In FIG. 6, there are shown an increase in damping ratio B/A and a decrease in outer magnetic shielding effect with respect to an increase in value of L, and overall effects which can be obtained by multifying damping factors by outer magnetic shielding effects.

A second embodiment of the present invention will be described in reference to FIGS. 4 and 5.

Figure 4:
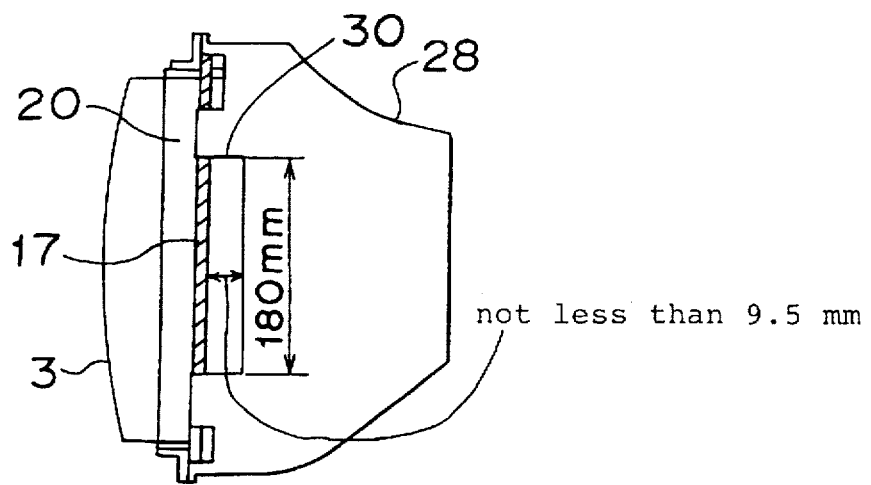
FIG. 4 is a schematic view of a second embodiment of the demagnetizing device showing how the demagnetizing coil is mounted and how the outer magnetic shielding member is cut out.

In FIG. 4, reference numeral 28 designates an outer magnetic shielding member which has a cutout 30 formed therein. Reference numeral 3 designates the CRT. Reference numeral 17 designates a demagnetizing coil which is fixed on an inner surface of the outer magnetic shielding member 28 according to the second embodiment.

Figure 5:
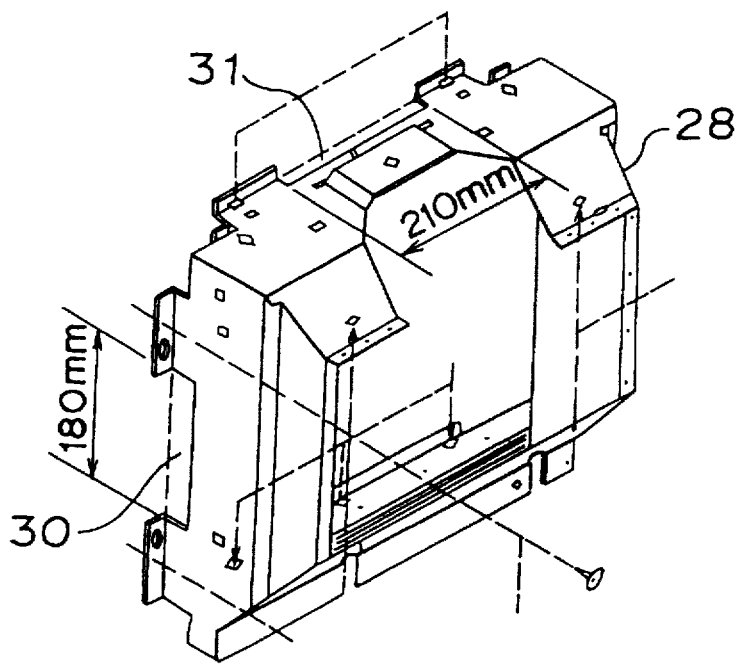
FIG. 5 is a perspective view of the outer magnetic shielding member of FIG. 4.

As shown in FIG. 5, the outer magnetic shielding member 28 has a right side surface, a left side surface, an upper surface and a bottom surface cut out therein to form the cutouts 30 (20 mm×180 mm) and cutouts 31 (20 mm×210 mm) in order to minimize an area which the outer magnetic shielding member 28 is closed to the demagnetizing coil 17.

In FIG. 5, there is shown an example of the sizes of the cutouts when the outer magnetic shielding member 28 is applied to a so-called 17 inch CRT. If the CRT 3 gets larger, the length of the cutouts is required to be increased according to an increase in length of the circumference of the outer magnetic shielding member 28 though the width (cutout depth), 20 mm, of the cutouts is almost unchanged. Even if the CRT 3 is smaller, the width of the cutouts is required to be at least 9.5 mm.

The function of the second embodiment will be explained. Since the outer magnetic shielding member 28 shown in FIG. 5 has the cutouts 30 and 31, the length of the area where the outer magnetic shielding member 28 contacts with the demagnetizing coil 17 is decreased to lessen iron loss when a damping current is flowed.

The decreased iron loss can lower the damping factor of the current which flows in the demagnetizing coil 17, thereby lengthen the damping time to improve demagnetizing ability.

The cutouts 30 and 31 in the outer magnetic shielding member 28 are formed so that the portions where the edges of the cutouts in the outer magnetic shielding member 28 are apart from the demagnetizing coil 17 by not less than 9.5 mm are as long as possible, e.g. occupy not less than 60% of the entire circumference of the demagnetizing coil. It is preferable in terms of the magnetic shielding effect that a plurality of the cutouts are formed, and that the cutouts are distributed as equally as possible in the upper, lower and opposed side surfaces of the outer magnetic shielding member 28.

The cutout depth of the cutouts 30 and 31 is preferable to be about 20 mm because, if the cutout depth is too large, the shielding effect by the outer magnetic shielding member is decreased.

It is clear that the first embodiment and the second embodiment can be combined.

Obviously, numerous modifications and variations of the present invention are possible in light of the above teachings. It is therefore to be understood that within the scope of the appended claims, the invention may be practiced otherwise than as specifically described herein.

What is claimed is:

1. A demagnetizing device for a cathode ray tube having a screen portion and a funnel portion, comprising:
    an outer magnetic shielding member arranged so as to surround a funnel portion of a cathode ray tube, and which is formed of a magnetic sheet; and
    a demagnetizing coil arranged so as to encircle a screen portion of the cathode ray tube;
    wherein the demagnetizing coil is arranged so as to be apart from the outer magnetic shielding member by not less than 9.5 mm and not greater than 20 mm such that iron loss is reduced when a damping current flows through the demagnetizing coil.

2. A demagnetizing device according to claim 1, wherein the demagnetizing coil is mounted to a circumference of a bezel which is arranged in front of the cathode ray tube.

3. A demagnetizing device for a cathode ray tube, comprising:
    a monolythic magnetic shielding member which is arranged so as to surround a funnel portion of a cathode ray tube and which is formed of a magnetic sheet; and
    a demagnetizing coil which is arranged at a front end of the outer magnetic shielding member so as to encircle a screen portion of the cathode ray tube;
    wherein the outer magnetic shielding member has cutouts formed therein along the demagnetizing coil, the cutouts having a width such that the distance between the demagnetizing coil and the outer magnetic shielding member is not less than 9.5 mm and not greater than 20 mm such that iron loss is reduced when a damping current flows through the demagnetizing coil, and having a length that is longer than 60% of the entire length of the demagnetizing coil.

4. A demagnetizing device according to claim 3, wherein the cutouts are arranged in an upper surface, a lower surface, and opposed side surfaces of the outer magnetic shielding member.

* * * * *